United States Patent
Zagromski

(10) Patent No.: US 8,813,428 B2
(45) Date of Patent: Aug. 26, 2014

(54) DOOR ARRANGEMENT AND ASSEMBLY METHOD FOR DOOR ARRANGEMENT

(75) Inventor: Frank Zagromski, Witten (DE)

(73) Assignee: Johnson Controls Technology Company, Holland, MI (US)

( * ) Notice: Subject to any disclaimer, the term of this patent is extended or adjusted under 35 U.S.C. 154(b) by 320 days.

(21) Appl. No.: 13/056,121

(22) PCT Filed: Jul. 24, 2009

(86) PCT No.: PCT/EP2009/005385
§ 371 (c)(1),
(2), (4) Date: Mar. 29, 2011

(87) PCT Pub. No.: WO2010/012422
PCT Pub. Date: Feb. 4, 2010

(65) Prior Publication Data
US 2011/0167731 A1  Jul. 14, 2011

(30) Foreign Application Priority Data

Jul. 28, 2008 (DE) .......................... 10 2008 035 173

(51) Int. Cl.
*E06B 3/00* (2006.01)
(52) U.S. Cl.
USPC ........................................................... 49/503
(58) Field of Classification Search
USPC .............. 49/502, 503; 16/412; 292/336.3, 28, 292/125, 225, 201, 216, DIG. 23, DIG. 25, 292/DIG. 30, DIG. 53, DIG. 64
See application file for complete search history.

(56) References Cited

U.S. PATENT DOCUMENTS

| | | | |
|---|---|---|---|
| 5,092,647 A | 3/1992 | Ueda et al. | |
| 5,377,450 A * | 1/1995 | Varajon | 49/502 |
| 5,884,434 A * | 3/1999 | Dedrich et al. | 49/503 |
| 7,905,059 B2 * | 3/2011 | Senoo | 49/503 |
| 2003/0177796 A1 * | 9/2003 | Dimig | 70/237 |
| 2011/0308172 A1 * | 12/2011 | Schidan et al. | 49/503 |

FOREIGN PATENT DOCUMENTS

| | | |
|---|---|---|
| CN | 1178504 | 4/1998 |
| DE | 3804086 | 8/1988 |
| DE | 197 12 266 A1 | 10/1998 |
| DE | 20 2006 012 577 U1 | 12/2007 |
| DE | 10 2006 058397 A1 | 7/2008 |
| EP | 0579535 | 1/1994 |

OTHER PUBLICATIONS

International Search Report for application No. PCT/EP2009/005385 mailed Oct. 9, 2009.
Chinese Office Action mailed Dec. 31, 2012.

* cited by examiner

*Primary Examiner* — Jerry Redman
(74) *Attorney, Agent, or Firm* — Fletcher Yoder, P.C.

(57) ABSTRACT

A door arrangement comprises a first carrier element and a second carrier element. The first carrier element has a first door module and the second carrier element has a second door module. The first door module is releasably fastened to the first carrier element by fastening means and has a first coupling element. The second door module has a second coupling element. The second door module has unlocking elements for releasing the fastening means in case of the first coupling element being coupled to the second coupling element.

18 Claims, 3 Drawing Sheets

DOOR ARRANGEMENT AND ASSEMBLY METHOD FOR DOOR ARRANGEMENT

CROSS REFERENCE TO RELATED APPLICATIONS

Figure 1:
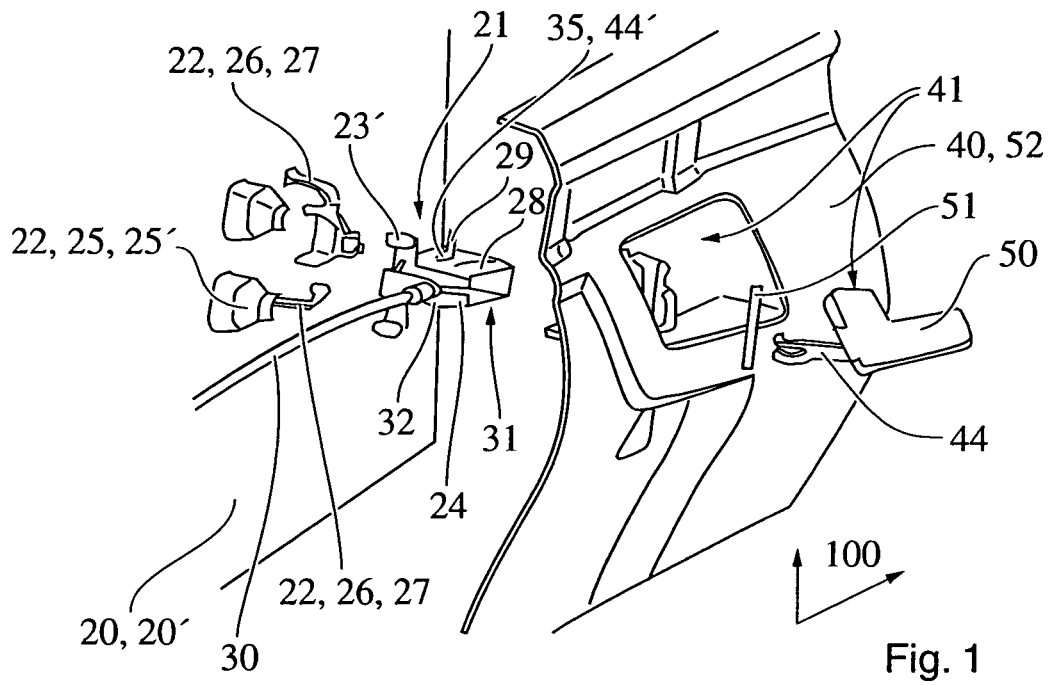

This application claims priority from and the benefit of PCT Application No. PCT/EP2009/005385, filed on Jul. 24, 2009 and German Patent DE 10 2008 035 173.3, filed on Jul. 28, 2008; all entitled "Door Arrangement and Assembly Method for a Door Arrangement", which are herein incorporated by reference.

BACKGROUND

The invention relates to a door arrangement having a first carrier element and a second carrier element, the first carrier element having a first door module and the second carrier element having a second door module, the first door module being fastened releasably to the first carrier element by means of fastening means, and the first door module having a first coupling element and the second door module having a second coupling element.

Door arrangements of this type are generally known. For example, DE 197 12 266 A1 has disclosed a motor vehicle door with a shell door body and an inner trim body, both the shell door body and the inner trim body having functional components which are connected to one another by means of a central plug connection, the central plug connection having a plug on the inner trim body and a corresponding mating plug on the shell door body, and the plug coming into engagement with the mating plug in the y direction of the vehicle during the assembly of the inner trim body on the shell door body. As a result of the fixing of the plug on the shell door body and the fixing of the mating plug on the inner trim part, the requirements made of the manufacturing tolerances are comparatively high, since the plug connection is produced automatically during the assembly of the inner trim body. A positional deviation which is only slight between the plug and the mating plug leads to no functional coupling being produced between the plug and the mating plug. This can scarcely be detected during the assembly of the inner trim part, since the plug connection cannot be observed from outside the door interior and can also as a rule not be reached. This problem is increased further by a tolerance compensating suspension of the mating plug, such as by way of a floating bearing, since yielding of the plug in the y direction considerably increases the risk of coupling not occurring between the plug and the mating plug.

SUMMARY

It is an object of the present invention to provide a door arrangement which firstly can be assembled easily and inexpensively and secondly ensures a reliable and verifiable functional connection between the first and the second coupling elements during the assembly of the second carrier element on the first carrier element and, furthermore, does not have the disadvantages of the prior art.

The object is achieved by a door arrangement having a first carrier element and a second carrier element, the first carrier element having a first door module and the second carrier element having a second door module, the first door module being fastened releasably to the first carrier element by means of fastening means, the first door module having a first coupling element and the second door module having a second coupling element, and, furthermore, the second door module having unlocking elements which are provided for releasing the fastening means in the case of the first coupling element being coupled to the second coupling element. As a result of this, it is advantageously possible that the first door module is prefixed by means of the fixing by way of the fastening means on the first carrier element before the assembly of the second carrier element on the first carrier element in a first position, in particular an assembly position, which is exposed, in comparison with a second position, in particular an end position, perpendicularly with respect to a door plane of the first carrier element in the direction of the second carrier element. In the case of an assembly movement of the second carrier element perpendicularly with respect to the door plane in the direction of the first carrier element, therefore first of all secure coupling of the first and the second coupling elements takes place which can be perceived, for example, by latching or clicking noises during the assembly operation or can be seen through a spacing between the first and the second carrier elements from outside the doors. During the coupling, at the same time indirect and/or direct unlocking of the fastening means by the unlocking elements takes place, with the result that, in the case of a further assembly movement of the second carrier element in the direction of the first carrier element, the first carrier module can be moved into the second position or into the end position, in which the first door module is no longer coupled to the fastening means or to the first carrier element and is arranged more closely to the first carrier element with respect to the first position. In the context of the present invention, coupling of the first and the second coupling elements comprises both a functional coupling between the first and the second coupling elements, which functional coupling comprises, in particular, a mechanical and/or electric coupling between functional components of the doors, and also a purely static coupling for fastening the first door module to the second door module, for example by latching of the first coupling element to the second coupling element. Functional components are, in particular, components for a vehicle door, such as window lifters, door locks, door handles, electric connecting elements, such as door control units and/or window lifter switches, and/or safety devices, such as sensors, side impact protection means and/or airbags.

According to the invention, it is preferred that the fastening means comprise first and second fastening modules, the first fastening modules being provided for fixing the first door module parallel to a door plane and the second fastening modules being provided for fixing the first door module perpendicularly with respect to the door plane, and the unlocking elements preferably being provided for releasing the second fastening modules, and, particularly preferably, canceling of the fixing of the first door module by way of the first fastening modules being provided in the case of a release of the second fastening modules. As a result of this, it is advantageously possible that the first door module is fixed reliably in the assembly direction of the second carrier element by way of the second fastening modules, with the result that, in particular in the case of the production of the coupling between the first and the second coupling elements, "yielding" of the first door module in the assembly direction is suppressed, and therefore reliable coupling is ensured in a particularly reliable way. Furthermore, the first door module is therefore also released parallel to the door plane by the first fastening modules, particularly advantageously solely by the release of the second fastening module, such that merely the first fastening modules have to be released by the unlocking elements.

Furthermore, it is preferred according to the invention that the second fastening modules comprise at least one latching arm which is fastened to the first carrier element and can be brought into latching engagement with a latching element on the first door module, and the unlocking elements comprising at least one ramp which is provided for bending the latching arm in the case of coupling, with the result that the latching arm is bent particularly advantageously by the ramp in a reversible manner such that the latching arm is spaced apart from the latching element and therefore the first door module is released from the second fastening module in a comparatively simple way.

Furthermore, it is preferred according to the invention that the first fastening modules are configured substantially as at least partially open cones which are preferably fastened by way of the base area to the first carrier element and are provided for receiving fastening elements of the first door module. The conical configuration of the first fastening modules advantageously makes it possible to fix the fastening elements in the first position and to release the fastening elements in the second position, the fastening elements being arranged in the more tapered part of the cone in the first position and being fixed as a result of the tapering of the cone parallel to the door plane, and the fastening elements being arranged in the cone further in the direction of the first carrier element in the second position and therefore no longer being fixed as a result of the tapering parallel to the door plane in the less tapered part of the cone. In the context of the present invention, an at least partially open cone comprises a cone which has a base area of the cone with an incomplete circle. For example, the base area comprises a semicircle or a quadrant. It is self-evident to a person skilled in the art that a substantially conical configuration also comprises all first fastening modules which are similar to cones in the broadest sense, the cross section of the fastening module for receiving the fastening element being substantially larger closer to the first carrier element than in a region of the first fastening element which is spaced further away from the first carrier element.

Furthermore, it is preferred according to the invention that first guide elements are arranged on the first door module and second guide elements are arranged on the second door module, engagement of the first and the second guide elements into one another preferably being provided in the case of coupling for fixing the relative position of the first and the second door modules parallel to the door plane, and the first and the second guide elements particularly preferably being provided for the self-finding assembly of the second carrier element on the first carrier element perpendicularly with respect to the door plane. As a result of this, it is advantageously possible for the assembly movement of the second carrier element in the direction of the first carrier element to be guided by the guiding of the second guide elements into the first guide element, and thus for a relative position to be fixed between the first and second carrier elements parallel to the door plane. The assembly operation of the second carrier element is therefore simplified considerably.

Furthermore, it is preferred according to the invention that the second carrier element comprises an inner trim part and the second door module comprises at least one door handle, the first carrier element preferably comprising an assembly carrier and the first door module preferably comprising an actuating mechanism, with the result that, particularly preferably, the connection of the door handle which is preassembled, in particular, on the inner trim part to the actuating mechanism which is preassembled, in particular, on the assembly carrier is simplified considerably during the assembly of the inner trim part on the assembly carrier, since the actuating mechanism is fastened releasably to the assembly carrier in the first position as described above and is displaced into the second position during coupling with the door handle on the inner trim part, the actuating mechanism at the same time being released from the assembly carrier. Subsequently, the inner trim part is connected to the assembly carrier, a coupling of the first door module to the second door module comprising, in the context of the present invention, in particular a functional connection between the door handle and the actuating mechanism, with the result that, for example, an actuation of the door handle produces the activation of the actuating mechanism.

A further subject of the present invention is an assembly method for a door arrangement, a first door module being fastened releasably to a first carrier element in a first position by means of fastening means in a first assembly step, a second door module being fastened to a second carrier element in a second assembly step, and a first coupling element of the first door module being coupled to a second coupling element of the second door module in a third assembly step, and, furthermore, in a fourth assembly step, the fastening means being released by unlocking elements on the second door module, and the first door module being positioned in a second position which is different than the first position. As a result, the assembly of the first carrier element on the second carrier element is simplified considerably in comparison with the prior art, and the coupling of the first coupling element to the second coupling element is realized such that it is considerably more reliable and can be verified during the assembly process. This is achieved by the fact that the first door module is fixed on the first carrier element in the first position in order to produce the coupling of the first coupling element and the second coupling element and, during the final fastening of the first carrier element to the second carrier element, the first carrier element is arranged in the second position and the fixing on the first carrier element is canceled, with the result that, in the assembly process, first of all the correct coupling between the first and second coupling elements can be produced and verified, and subsequently the first and the second carrier elements can finally be connected to one another.

It is preferred according to the invention that, in the fourth assembly step, the first door module is brought out of engagement with the fastening means and is fixed in the second position by the second door module, the first door module preferably being fixed by the coupling of the first coupling element with the second coupling element on the second door module, with the result that advantageously the first door module is not connected to the first carrier element in the end position, with the result that the manufacturing tolerances for the first carrier element can be reduced considerably and therefore the manufacturing costs can be reduced.

Furthermore, it is preferred according to the invention that, in the third and in the fourth assembly step, the second carrier element is moved perpendicularly with respect to a door plane in the direction of the first carrier element and/or, in a fifth assembly step which follows the fourth assembly step, the second carrier element is connected to the first carrier element, in particular releasably. As a result, comparatively simple and inexpensive assembly of the second carrier element with the first carrier element is particularly advantageously possible, since coupling of the first and the second carrier elements, release of the fastening means, displacement of the first door module from the first into the second position and fastening of the second carrier module to the first carrier module take place substantially solely by movement of the second carrier element perpendicularly with respect to the door plane, that is to say in the assembly direction.

Furthermore, it is preferred according to the invention that, in the fourth assembly step, a movement is carried out by the first door module perpendicularly with respect to the door plane and, in particular, in the direction of the first carrier element, with the result that the first position which is exposed, in comparison with the first carrier element, perpendicularly with respect to the door plane can be realized for initiating and securing the coupling between the first and the second coupling elements and, furthermore, the first door module can be arranged closer to the first carrier element in the second position, in a comparatively compact manner in terms of installation space.

Furthermore, it is preferred according to the invention that, in the third assembly step, a functional connection is produced between the first and the second door module, with the result that the function of the coupling between the first and the second coupling elements can be verified before the fastening of the second carrier element to the first carrier element.

DRAWINGS

Exemplary embodiments of the invention are shown in the drawing and are explained in greater detail in the following description.

Figure 2:
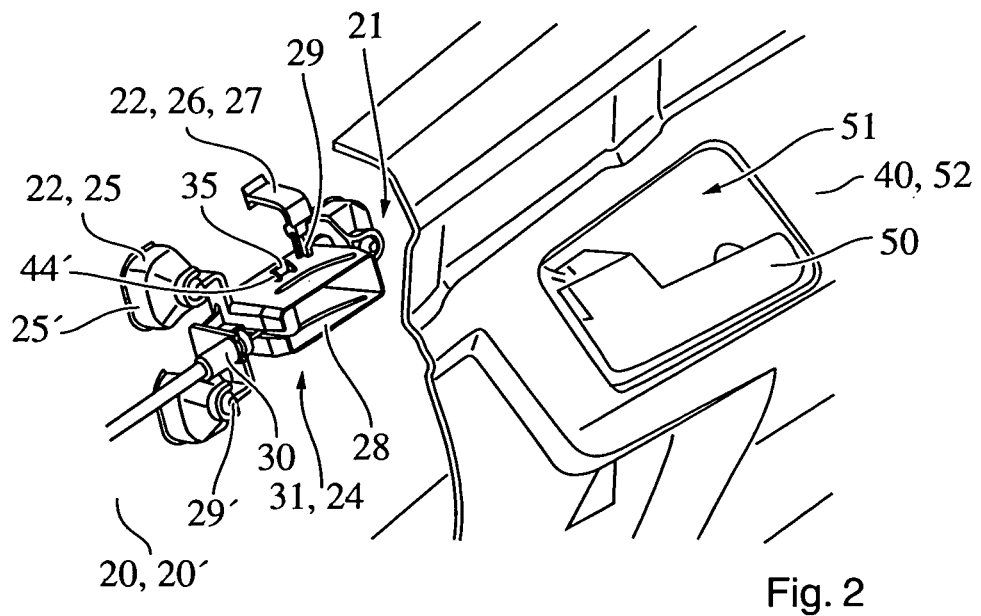
Figure 3:
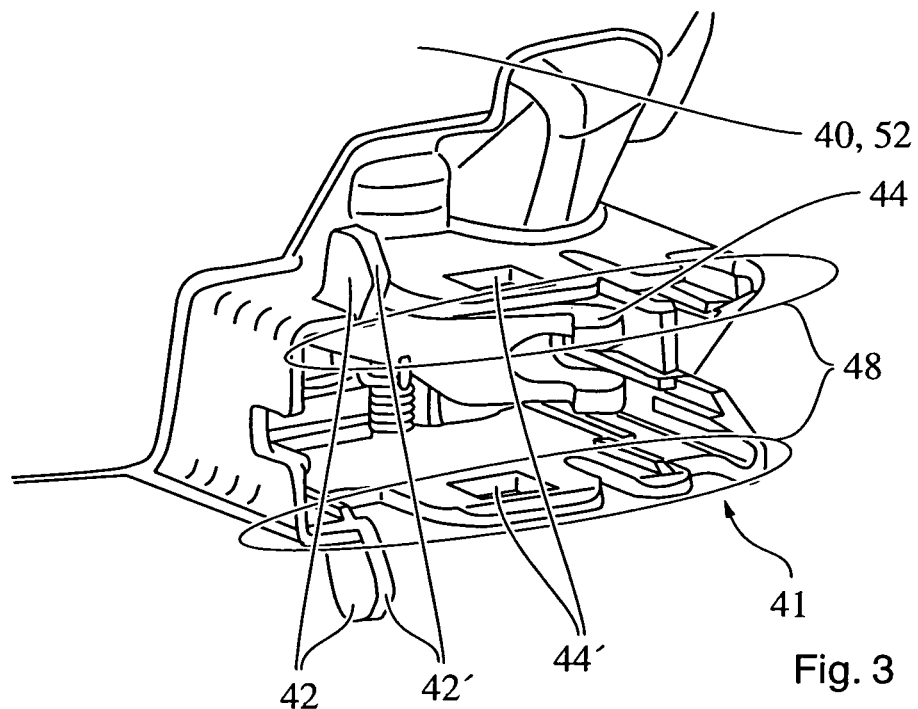
Figure 4:
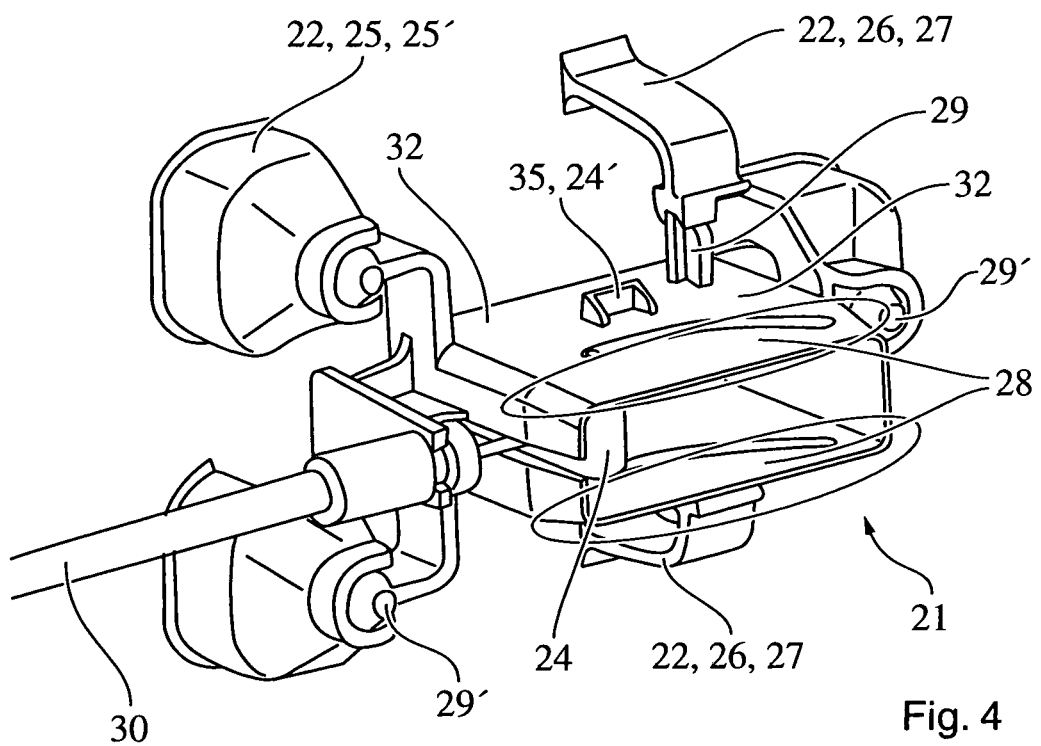
Figure 5:
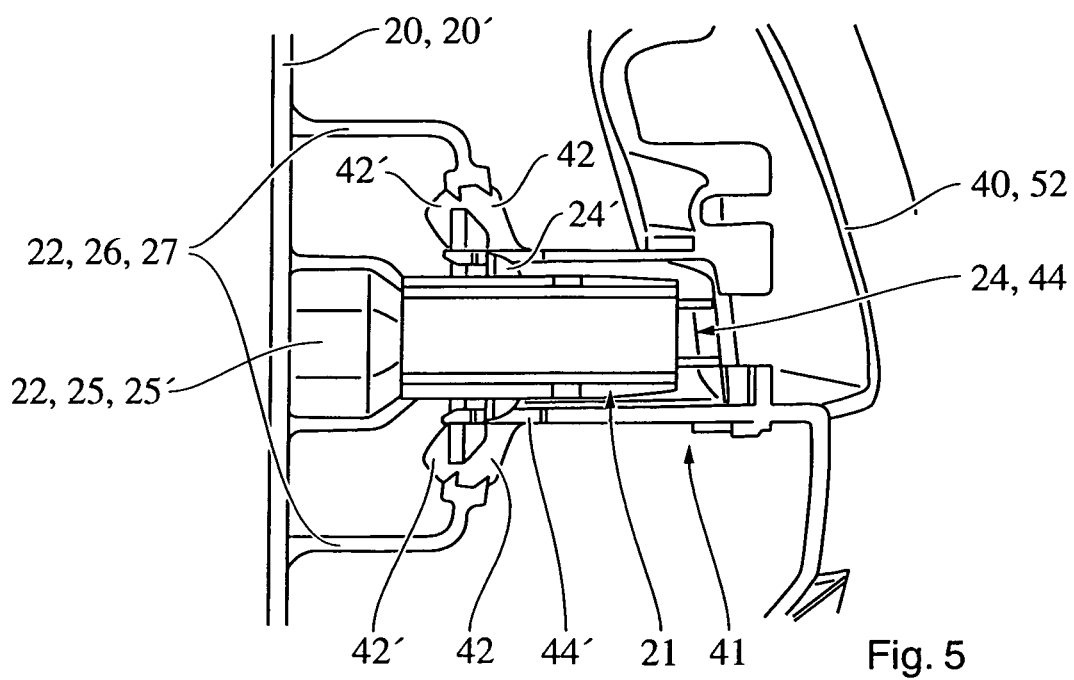

FIGS. 1 and 2 show a diagrammatic perspective view of a door arrangement according to the invention, chronologically before the assembly steps are carried out, FIG. 3 shows a diagrammatic perspective view of a second door module of a door arrangement according to the invention, FIG. 4 shows a diagrammatic perspective view of a first door module of a door arrangement according to the invention, and FIG. 5 shows a diagrammatic side view of a door arrangement according to the invention, chronologically after the assembly steps are carried out.

DETAILED DESCRIPTION

FIG. 1 shows a first carrier element 20, in particular in the form of an assembly carrier 20' for a vehicle door, with fastening means 22, the fastening means 22 comprising first fastening modules 25 which are configured substantially in the form of an open cone 25', are fastened by way of the base area to the first carrier element 20 and taper perpendicularly with respect to a door plane 100 of the first carrier element 20 with an increasing spacing from the first carrier element 20, the base area or the cross section of the cone 25' substantially describing a semicircle. Furthermore, the fastening means 22 comprise second fastening modules 26 in the form of two latching arms 27 which protrude from the first carrier element 20 perpendicularly with respect to the door plane 100 in the direction of a second carrier element 40. Furthermore, FIG. 1 shows a first door module 21 which has latching elements 29 which are configured for latching with the latching arms 27 and therefore for fixing the first door module 21 in a first position in later assembly steps. The first door module 21 comprises fastening elements 29' which are received by the first fastening modules 25 in later assembly steps, and an actuating mechanism 31 which actuates a Bowden cable 30 for controlling a door lock (not shown). Furthermore, the first door module 21 has a frame 32 and first guide elements 28 on the frame 32. The second carrier element 40 comprises an interior trim part 52 with an opening 51 for receiving a door handle 50, the door handle 50 being plugged into the opening 51, in particular, in a direction perpendicularly with respect to the door plane 100 and is optionally configured for latching with the second carrier element 40. The door handle 50 comprises a second coupling element 44 in the form of an actuating lever which is configured in such a way for coupling with a first coupling element 24 of the first door module 21 or of the actuating mechanism 31 that, as a result of a functional connection between the first and the second coupling elements 24, 48, the actuating mechanism 31 is actuated by actuation of the door handle 50.

In FIG. 2, the door handle 50 is arranged in the opening 50 of the second carrier element 40 after a second assembly step is carried out. Furthermore, the first door module 21 is prefixed releasably on the first carrier element 20 by means of the fastening means 22 in a first assembly step in a first position or in an assembly position, the fastening elements 29' being arranged in such a way in a maximum tapered part of the first fastening modules 25 that the tapering suppresses a movement of the first door module 21 parallel to the door plane 100. Fixing of the first door module 21 parallel to the door plane 100 is achieved by latching of the latching arms 27 with the latching elements 29.

FIG. 3 shows a view of the second carrier element 40 together with the second door module 41 as seen from the first carrier element 20, the second coupling elements 44 being illustrated in the form of the actuating lever and second guide elements 48, it being possible for the second guide elements 48 to be brought into engagement with the first guide elements 28 during the assembly of the second carrier element 40 on the first carrier element 20, with the result that the second guide elements 48 enclose the first guide elements 28 parallel to the door plane 100 and therefore fix a relative position of the second carrier element 40 relative to the first carrier element 20. Furthermore, the second door module 41 has unlocking elements 42 which are provided for releasing the latching arms 27 during coupling of the first coupling element 24 with the second coupling element 48. This is achieved by a ramp 42' on a side of the unlocking elements 42, which side faces the second carrier element 40, and which unlocking elements 42 bend the latching arms 27 in such a way during a movement of the second door module 41 in the direction of the first door module 21 perpendicularly with respect to the door plane 100 that said latching arms 27 are disengaged from the latching elements 29 and the first door module 21 is therefore no longer fixed in the assembly direction perpendicularly with respect to the door plane 100, and the first door module 21 can therefore be transferred into a second position closer to the first carrier element 20, the fastening elements 29' no longer being fixed parallel to the door plane 100 in the case of a displacement of the first door module 21 in the direction of the first carrier element 20 as a result of the tapering of the first fastening modules 25 with increasing distance from the first carrier element 20, and the first door module 21 therefore being decoupled from the first carrier element 20. Furthermore, the second door module 40 has a further second coupling element 44' which has an opening for receiving a further first coupling element 24' in the form of a latching lug 35 on the first door module 21, with the result that a mechanical fixed connection is realized between the first and the second door modules 21, 41 by coupling or latching of the further first and the further second coupling elements 24', 44'.

In FIG. 4, an enlargement of the first door module 21 is shown together with the first carrier element 20, in a similar manner to FIG. 2, the positioning of the first door module 21 on the first carrier element 20 being shown in the first position or in the assembly position.

FIG. 5 shows a diagrammatic side view of the door arrangement in the assembled position, the first door module 21 being connected mechanically fixedly to the second door module 41 by means of the further first and the further second coupling elements 24', 48' after a third assembly step is carried out, the unlocking elements 42 producing bending of the second fastening elements 26 or the latching arms 27 in a fourth assembly step, as a result of which the latching arms 27 are spaced apart from the latching elements 29, the fastening elements 29' being arranged in the second fastening modules 25 in such a way that the fastening elements 29' are decoupled from the second fastening modules 25, the first door module 21, furthermore, having been transferred from the first position into a second position in the fourth assembly step and, in the third assembly step, the first coupling element 24 being coupled with the second coupling element 44 in such a way that the Bowden cable 30 can be actuated by means of the door handle 50 via the actuating mechanism 31. In a following fifth assembly step, the first and the second carrier elements 20, 40 are optionally connected mechanically fixedly to one another, in particular releasably.

LIST OF REFERENCE SYMBOLS

1 Door arrangement
20 First carrier element
20' Assembly carrier
21 First door module
22 Fastening means
24, 24' First coupling element
25 First fastening modules
25' Cone
26 Second fastening modules
27 Latching arm
28 Second guide elements
29 Latching elements
29' Fastening elements
31 Actuating mechanism
32 Frame
35 Latching lug
40 Second carrier element
41 Second door module
42 Unlocking elements
42' Ramp
44, 44' Second coupling element
48 First guide elements
50 Door handle
52 Inner trim part
100 Door plane

The invention claimed is:

1. A door arrangement comprising a first carrier element and a second carrier element, the first carrier element having a first door module and the second carrier element having a second door module, the first door module being fastened releasably to the first carrier element by fastening means, the first door module having a first coupling element and the second door module having a second coupling element, wherein the second door module has unlocking elements which are provided for releasing the fastening means upon the first coupling element being coupled to the second coupling element;
wherein the fastening means comprises first and second fastening modules, the first fastening module being provided for fixing the first door module parallel to a door plane, the second fastening module being provided for fixing the first door module perpendicularly with respect to the door plane, the first fastening module is configured substantially as at least partially open cones, and the cones are fastened by a base area to the first carrier element and receive fastening elements of the first door module.

2. The door arrangement as claimed in claim 1, wherein the second fastening module comprises at least one latching arm which is fastened to the first carrier element and can be brought into latching engagement with a latching element on the first door module.

3. The door arrangement as claimed in claim 2, wherein the unlocking elements comprise at least one ramp for bending the at least one latching arm.

4. The door arrangement as claimed in claim 1, wherein first guide elements are arranged on the first door module, second guide elements are arranged on the second door module, and engagement of the first and the second guide elements into one another couple the first and the second carrier elements parallel to the door plane.

5. The door arrangement as claimed in claim 4, wherein the first and second guide elements are configured for assembly of the second carrier element on the first carrier element perpendicularly with respect to the door plane.

6. The door arrangement as claimed in claim 1, wherein the second carrier element comprises an inner trim part and the second door module comprises at least one door handle.

7. The door arrangement as claimed in claim 6, wherein the first carrier element comprises an assembly carrier and the first door module comprises an actuating mechanism.

8. The door arrangement as claimed in claim 1, wherein the unlocking elements are configured to release the second fastening module.

9. The door arrangement as claimed in claim 8, wherein the first door module is decoupled from the first fastening module via the release of the second fastening module.

10. A door arrangement comprising a first carrier element and a second carrier element, the first carrier element having a first door module and the second carrier element having a second door module, the first door module being fastened releasably to the first carrier element by fastening means, the first door module having a first coupling element and the second door module having a second coupling element, wherein the second door module has unlocking elements which are provided for releasing the fastening means upon the first coupling element being coupled to the second coupling element;
wherein first guide elements are arranged on the first door module, second guide elements are arranged on the second door module, engagement of the first and the second guide elements into one another couple the first and the second carrier elements parallel to the door plane, and the first and second guide elements are configured for assembly of the second carrier element on the first carrier element perpendicularly with respect to the door plane.

11. The door arrangement as claimed in claim 10, wherein the second carrier element comprises an inner trim part and the second door module comprises at least one door handle.

12. The door arrangement as claimed in claim 11, wherein the first carrier element comprises an assembly carrier and the first door module comprises an actuating mechanism.

13. The door arrangement as claimed in claim 10, wherein the fastening means comprises first and second fastening modules, the first fastening module being provided for fixing the first door module parallel to a door plane, and the second fastening module being provided for fixing the first door module perpendicularly with respect to the door plane.

14. The door arrangement as claimed in claim 13, wherein the second fastening module comprises at least one latching arm which is fastened to the first carrier element and can be brought into latching engagement with a latching element on the first door module.

15. The door arrangement as claimed in claim 14, wherein the unlocking elements comprise at least one ramp for bending the at least one latching arm.

16. The door arrangement as claimed in claim 13, wherein the first fastening module is configured substantially as at least partially open cones.

17. The door arrangement as claimed in claim 13, wherein the unlocking elements are configured to release the second fastening module.

18. The door arrangement as claimed in claim 17, wherein the first door module is decoupled from the first fastening module via the release of the second fastening module.

* * * * *